Patented Nov. 23, 1943

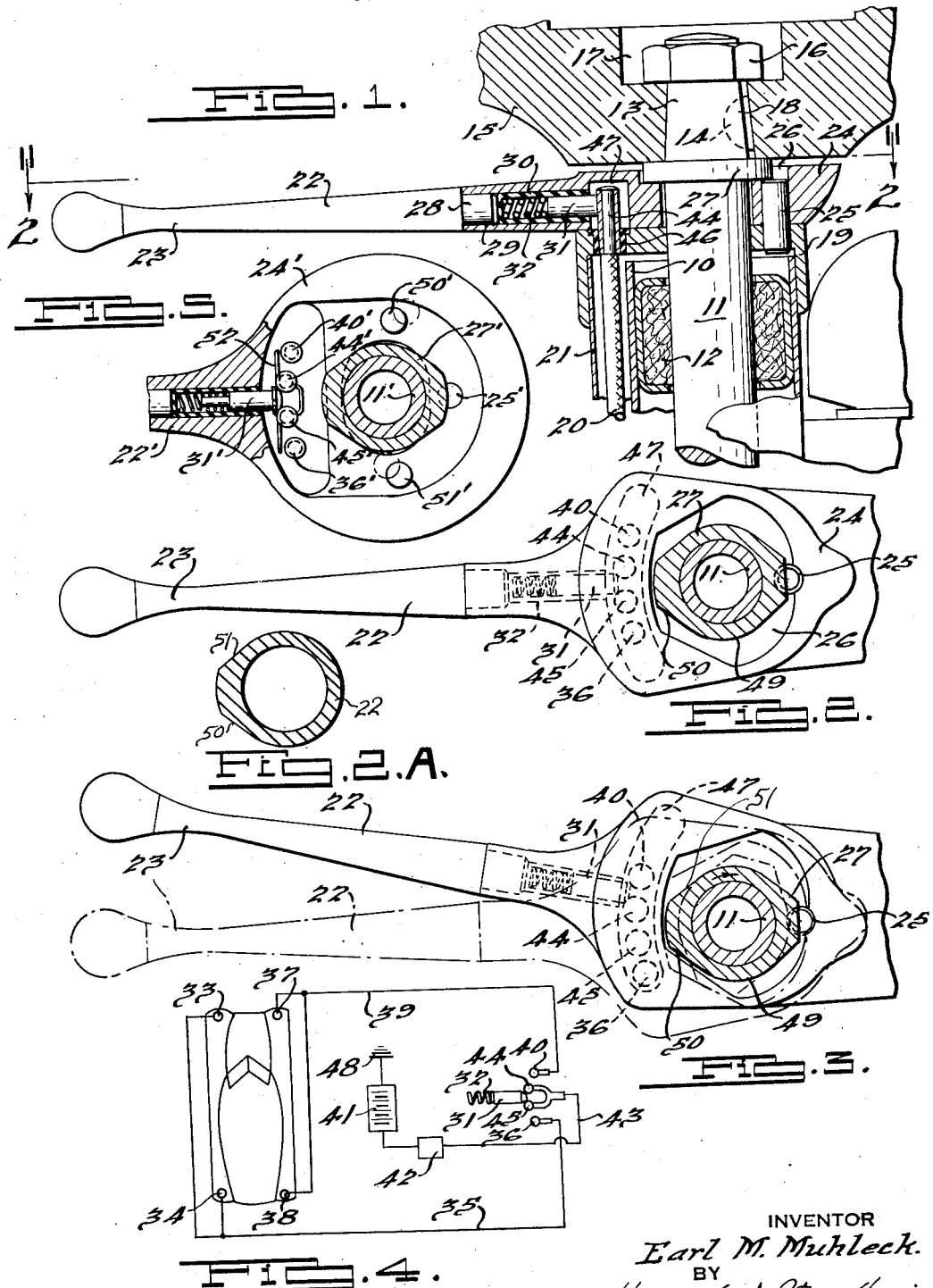

2,334,882

UNITED STATES PATENT OFFICE 2,334,882

DIRECTION SIGNAL SWITCH

Earl M. Muhleck, Detroit, Mich., assignor to Chrysler Corporation, Highland Park, Mich., a corporation of Delaware Application January 28, 1941, Serial No. 376,359

10 Claims. (Cl. 200—59)

This invention pertains to switch mechanism suitable for mounting on automobile steering columns.

More particularly, it relates to a switch mechanism for operating a vehicle direction signal.

In all of the self-cancelling direction signal operating mechanisms of the prior art, costly and complicated structures are used and the mechanism easily gets out of order. Another disadvantage of prior art mechanisms resides in the fact that the self-cancelling feature depends upon reverse rotation of the steering wheel after the turn has been completed; thus the signal is "on" while the turn is being negotiated and a clicking sound is almost always heard during forward turning of the wheel because of the intermittent engagement of the cancelling finger with the switch return cam.

In the present device, a simple, foolproof, rugged and inexpensive mechanism is used. The signal is cancelled upon turning of the steering wheel in either direction after a signal has been given, thus silent operation is achieved and the signal operates only while the contemplated turn is being indicated.

Accordingly, it is the primary object of the invention to provide a direction signal switch operating mechanism which is superior to those of the prior art from the standpoint of cost, durability and simplicity.

A further object is to provide in a mechanism of the aforesaid type automatic cancellation means which is operable immediately upon turning of the steering wheel in either direction.

A still further object is to provide a self-cancelling direction signal switch which is silent in operation.

Further objects and advantages of the invention will be apparent from the following description. In the drawing which accompanies the description, Fig. 1 is a fragmentary sectional elevational view of the top portion of a steering column illustrating the details of my novel switch mechanism.

Fig. 2 is a sectional view along the line 2—2 of Fig. 1.

Fig. 2A is a sectional view of a modified form of cam.

Fig. 3 is a view similar to Fig. 2 showing the switch in one of its operative positions.

Fig. 4 is a wiring diagram, and

Fig. 5 is a fragmentary sectional view of a modified form of switch.

Referring to the drawing, I have shown a steering column 10 surrounding a steering column shaft 11, a bushing 12 maintaining the parts in spaced relation. The shaft 11 has a tapered top portion 13 provided with a keyway 14. A steering wheel, generally indicated at 15 is mounted on the top portion 13 and has a counterbore 17 for receiving a retaining nut 16. The steering wheel hub portion has an integral key 18 which is adapted to engage the keyway 14 for preventing relative rotation between the shaft 11 and wheel.

The steering column 10 carries at the top thereof, a bracket 19. The latter is of irregular shape and is eccentrically positioned on the top of the column, to which it is rigidly fastened by suitable means, in such manner that the wires 20 of the direction signal are accommodated. A light metallic cover 21 is carried by the overhanging portion of the bracket and conceals the wires 20 from view.

The direction signal operating lever, generally designated by numeral 22, comprises a finger engaging portion 23 which is preferably, but not necessarily, formed of plastic material, and a metallic hub portion 24. The latter is carried on the top of the bracket 19 and is pivotally attached to the bracket by a pin 25. As clearly shown in Fig. 2, the hub portion 24 is provided with a cam-shaped opening 26 which is adapted to cooperate with a cam 27 non-rotatably carried by the steering shaft 11 for returning the lever 22 to neutral from either of its signal operating positions. This feature will be hereinafter more fully explained.

The finger engaging portion 23 has a reduced portion 28 which is adapted to fit into a bore 29 provided in the hub portion for receiving the same as illustrated. The bore 29 also contains an insulating cup 30 in which is disposed a pin 31. The latter is urged outwardly of the cup by a spring 32 for a purpose about to be described.

Referring now to Fig. 4, it may be seen that the left hand front and rear direction signal lights 33, 34, are connected by means of a wire 35 (which is one of the wires generally referred to at 20) with a switch contact 36. The right hand lights 37, 38 are similarly connected by a wire 39 to a switch contact 40.

The vehicle battery 41 is connected through a flasher 42 and wire 43 with a pair of switch contacts 44, 45. The contacts 36, 40, 44 and 45 are all carried by the bracket 19, an insulating washer 46 surrounding each of them and serving to retain them in place as well as electrically insulate the contacts from the frame of the car which is grounded in accordance with conventional practice.

The hub 24 is provided with an elongated arcuate slot 47 for accommodating the switch contacts which are engaged by the pin 31. When the lever 22 is in neutral position (Figs. 1 and 2) the pin 31 engages the switch contacts 44 and 45, and as these contacts are both connected to the battery 41, the signal lights are not energized. When the lever 22 is swung in a clockwise direction about the pin 25 to the position shown in Fig. 3, the pin 31 is moved to such position that it bridges the switch contacts 40 and 44. Electric current then passes from the battery 41 (which is grounded at 48) through the flasher 42, wire 43, contact 44, pin 31, contact 40 and wire 39 to the right hand direction signal lights 37 and 38 which flash to indicate a contemplated right turn of the vehicle. The swinging of the lever 22 is facilitated by the spring 32 which permits the pin 31 to yield axially of the lever. The pin 31 is tapered slightly at its outer end, as illustrated, so that it is adapted to extend a short distance into the space between adjacent switch contacts thereby acting to yieldably retain the lever in position besides assuring a good electrical connection.

The signal lights 37, 38 will continue to flash until the lever 22 is moved back to neutral position which may be accomplished manually at any time, or automatically in response to turning of the steering wheel in either direction. For example, if the driver turns the steering wheel clockwise while the lever 22 is in its Fig. 3 position, the lever will be cammed back to neutral by the action of the cam 27, the portion 49 thereof engaging the adjacent inner cammed surface of the hub 24. If the steering wheel is turned counterclockwise while the lever 22 is in the Fig. 3 position, the portion 50 of the cam 27 will engage the adjacent surface of the hub and the lever 22 will be returned to neutral.

The return of the lever 22 to neutral extinguishes the signal lights and the device is in condition for operation to indicate another turn. The action of the cam 27 in returning the lever to neutral is almost immediate, thus the signals are not left "on" for periods longer than necessary and they are cancelled automatically, either in response to a turn of the vehicle in the direction indicated, or a turn in the opposite direction.

The particular cancellation arrangement described is particularly advantageous in that it entirely eliminates the clicking sound which invariably accompanies the operation of the automatic cancellation mechanisms of the prior art. My cancellation mechanism is extremely simple, yet positive in operation and effects cancellation of the signal almost immediately in response to a turn of the steering wheel in either direction.

The operation of the signal switch in indicating a contemplated left turn is identical with that described above except that switch contacts 36 and 45 are bridged by the pin 31.

Fig. 5 illustrates a modification of the invention which differs from the form just described in a number of particulars.

In the Fig. 5 modification, the hub portion 24' of the lever structure 22' is provided with an enlarged opening 26' of no particular shape and a pair of oppositely disposed pins 50, 51 are carried by the hub. The pins 50', 51' are mounted in such relation to the cam 27' that the cam will engage the respective pins and return the lever 22' to neutral upon turning of the steering wheel in a manner identical with that just described. Fig. 5 illustrates, by means of dotted lines, the operative positions of the pins for indicating a right turn.

The switch of Fig. 5 differs from that of Figs. 1-3 in that a spring switch element 52 is provided for connecting the respective signal energizing contacts 36', 40', to the "hot" contacts 44', 45' of the switch. The spring element 52 is carried by the contacts 44', 45' and the respective end portions thereof are adapted for engagement by the spring pressed plunger 31' to complete a circuit to one of the pair of signal lights upon oscillation of the switch lever. The operation will be apparent from the drawing.

In both forms of the invention the signals are extinguished immediately and in response to very slight turning of the steering wheel in a direction opposite to that for which the signal indicates. If the wheel is turned in the indicated direction, a considerably greater rotation of the steering wheel is required to extinguish the signal. In the preferred embodiments shown, about 75° of rotation of the wheel is required to extinguish the signal when the wheel is rotated to turn the vehicle in accordance with the signal indication. The turning arc necessary to extinguish the signal may be varied as desired by suitably altering the shape of the cam 27 or 27'. The cams shown are "double" and it is apparent that by making the cam "single" as shown in Fig. 2A, the arc of rotation necessary to cancel the signal may be increased to approximately 150°, because it will then be necessary for the cam surface 51 to engage the inner cammed surface of the member 24 before the signal is cancelled. The same result may be obtained in the Fig. 5 modification by suitably modifying the cam 27'.

It may thus be seen that I have provided a novel direction signal switch which is extremely simple and easy to manufacture, yet rugged and positive in action.

I claim:

1. In a direction signal mechanism for a vehicle having a steering column and a steering shaft mounted in said column, a switch operating lever pivotally carried by said column and adapted for movement from neutral to right or left turn indicating positions respectively, said lever having an opening through which said shaft extends; and a cam carried by said shaft and adapted to operably engage the sides of said opening when said lever is in a turn-indicating position whereby said lever is returned to neutral in response to turning of said shaft.

2. In a direction signal mechanism for a vehicle having a steering column and a steering shaft mounted in said column, a switch operating lever pivotally carried by said column and adapted for movement from neutral to right or left turn indicating positions respectively, said lever having an opening through which said shaft extends; and a cam carried by said shaft and adapted to operably engage the sides of said opening when said lever is in a turn-indicating position whereby said lever is returned to neutral in response to turning of said shaft; the disposition and shape of said cam relative to said opening being such that said lever is returned to neutral in response to slight turning of said shaft in a direction opposite to that for which the lever is set and to relatively greater turning thereof in the direction for which the lever is set 3. In a direction signal mechanism for a vehicle having a steering column and a steering shaft mounted in said column, a switch operating lever pivotally carried by said column and adapted for movement from neutral to right or left turn indicating positions respectively, a cam carried by said shaft and means carried by said lever adapted to operably engage said cam in response to turning of said shaft in either direction when said lever is in either of its turn-indicating positions for returning said lever to neutral.

4. In a direction signal mechanism for a vehicle having a steering column and a steering shaft mounted in said column, a switch operating lever pivotally carried by said column and adapted for movement from neutral to right or left turn indicating positions respectively, a cam carried by said shaft and means including a pair of pins carried by said lever adapted to operably engage said cam in response to turning of said shaft in either direction when said lever is in turn-indicating position for returning said lever to neutral.

5. In a direction signal mechanism for a vehicle having a steering column and a steering shaft mounted in said column, a switch operating lever pivotally carried by said column and adapted for movement from neutral to right or left turn indicating positions respectively, a cam carried by said shaft and means including an internal cam carried by said lever adapted to operably engage said cam in response to turning of said shaft in either direction when said lever is in either of its turn-indicating positions for returning said lever to neutral.

6. In a direction signal for a vehicle having a steering column and a steering shaft carried by the column, a bracket mounted on said column; a plurality of switch contacts carried by the bracket; a switch lever oscillatably mounted in the column and having a plunger adapted to engage said switch contacts thereby to energize right or left hand signal devices when the lever is moved from neutral to right or left hand switch operating positions respectively; means for yieldably retaining the lever in its respective positions; and means for moving the lever to neutral from either of its signal-energizing positions in response to turning of said shaft in either direction.

7. In a direction signal for a vehicle having a steering column and a steering shaft carried by the column, a bracket mounted on said column; a plurality of switch contacts carried by the bracket; a switch lever oscillatably mounted in the column and having a plunger adapted to engage said switch contacts thereby to energize right or left hand signal devices when the lever is moved from neutral to right or left hand switch operating positions respectively; means for yieldably retaining the lever in its respective positions; and means including a cam carried by said shaft for moving the lever to neutral from either of its signal-energizing positions in response to turning of said shaft in either direction.

8. In a direction signal for a vehicle having a steering column and a steering shaft carried by the column, a bracket mounted on said column; a plurality of switch contacts carried by the bracket; a switch lever oscillatably mounted in the column and having a plunger adapted to engage said switch contacts thereby to energize right or left hand signal devices when the lever is moved from neutral to right or left hand switch operating positions respectively; means including said plunger for yieldably retaining the lever in its respective positions; and means for moving the lever to neutral from either of its signal-energizing positions in response to turning of said shaft in either direction.

9. In a direction signal for a vehicle having a steering column and a steering shaft carried by the column; a bracket mounted on said column; four switch contacts mounted on said bracket; a switch lever oscillatably mounted on the column and having a plunger adapted to yieldably engage adjacent pairs of said contacts; electrical conductors connecting the centrally disposed adjacent pair of contacts with the vehicle battery; additional electrical conductors connecting the other switch contacts with right and left hand signal devices respectively; and means for automatically returning the lever to neutral from either of its signal energizing positions in response to turning of said shaft in either direction.

10. In a direction signal for a vehicle having a steering column and a steering shaft carried by the column; a bracket mounted on said column; a plurality of switch contacts carried by said bracket; a switch lever oscillatably mounted on said column; a spring-pressed plunger carried by said lever and adapted to engage adjacent contacts, the contacts being so disposed that a right or left turn is indicated in response to oscillation of the lever in a clockwise or counterclockwise direction from neutral, and means for automatically returning said lever from either of its signaling positions to neutral in response to turning of said shaft in either direction.

EARL M. MUHLECK.